US011358561B2

(12) United States Patent
Ishii et al.

(10) Patent No.: US 11,358,561 B2
(45) Date of Patent: Jun. 14, 2022

(54) AIRBAG DEVICE FOR A DRIVER'S SEAT

(71) Applicant: TOYODA GOSEI CO., LTD., Kiyosu (JP)

(72) Inventors: Tsutomu Ishii, Kiyosu (JP); Koji Kawamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/207,907

(22) Filed: Mar. 22, 2021

(65) Prior Publication Data
US 2021/0300290 A1  Sep. 30, 2021

(30) Foreign Application Priority Data
Mar. 31, 2020  (JP) .............................. JP2020-063221

(51) Int. Cl.
*B60R 21/233* (2006.01)
*B60R 21/203* (2006.01)
*B60R 21/217* (2011.01)
*B60R 21/231* (2011.01)

(52) U.S. Cl.
CPC .......... *B60R 21/233* (2013.01); *B60R 21/203* (2013.01); *B60R 21/217* (2013.01); *B60R 2021/23107* (2013.01)

(58) Field of Classification Search
CPC ... B60R 21/203; B60R 21/217; B60R 21/231; B60R 21/233; B60R 2021/23107; B60R 2021/23324; B60R 2021/23332; B60R 2021/23382; B60R 2021/2346
See application file for complete search history.

(56) References Cited

U.S. PATENT DOCUMENTS

| 5,913,535 | A  | * | 6/1999  | Taguchi | B60R 21/2346 |
|-----------|----|---|---------|---------|--------------|
|           |    |   |         |         | 280/743.1    |
| 6,382,662 | B1 |   | 5/2002  | Igawa   |              |
| 7,360,791 | B2 | * | 4/2008  | Yamada  | B60R 21/2338 |
|           |    |   |         |         | 280/743.2    |
| 8,899,618 | B2 | * | 12/2014 | Eckert  | B60R 21/203  |
|           |    |   |         |         | 280/743.2    |
| 10,654,440| B2 | * | 5/2020  | Hotta   | B60R 21/2338 |

(Continued)

FOREIGN PATENT DOCUMENTS

| JP | 2001-80440 A | 3/2001 |
|----|--------------|--------|
| JP | 2012-6598 A  | 1/2012 |

(Continued)

*Primary Examiner* — Laura Freedman
(74) *Attorney, Agent, or Firm* — Posz Law Group, PLC

(57) ABSTRACT

An airbag for an airbag device includes an outer bag and an inner bag inflatable inside the outer bag. The outer bag includes a driver-side wall for receiving the driver and a vehicle-side wall that is supported by a ring surface of a ring portion of the steering wheel at airbag deployment, and includes an inlet port of inflation gas and a mounting portion on the steering wheel. The inner bag includes a supply port for supplying the gas to the outer bag. The inner bag completes inflation prior to the outer bag, and the outer bag is inflated with the gas supplied from the supply port. The inner bag as inflated has such a shape that the rear portion protrudes farther rearward than a rear end of the ring surface, and that a height from the ring surface is greater in the rear portion than in the front portion.

3 Claims, 12 Drawing Sheets

(56) References Cited

U.S. PATENT DOCUMENTS

| | | | |
|---|---|---|---|
| 10,919,483 B2* | 2/2021 | Hotta | B60R 21/216 |
| 2018/0215339 A1 | 8/2018 | Nakanishi et al. | |
| 2018/0281731 A1* | 10/2018 | Hotta | B60R 21/233 |
| 2021/0053524 A1* | 2/2021 | Yamamoto | B60R 21/233 |
| 2021/0094498 A1* | 4/2021 | Takahashi | B60R 21/233 |

FOREIGN PATENT DOCUMENTS

| | | | |
|---|---|---|---|
| JP | 2018-122798 A | | 8/2018 |
| JP | 2020026211 A | * | 2/2020 |

* cited by examiner

FIG. 3
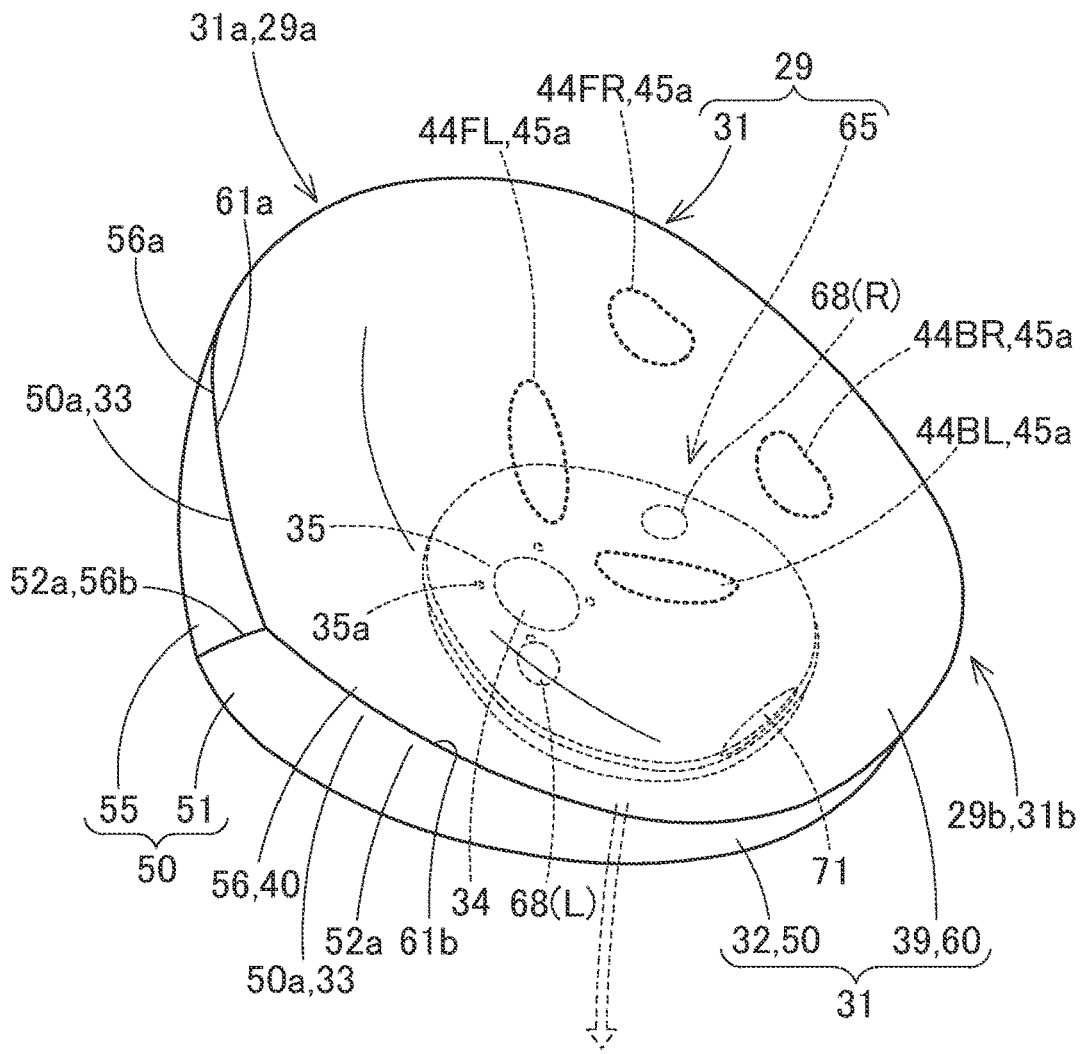
Schematic Sectional View of the Inner Bag
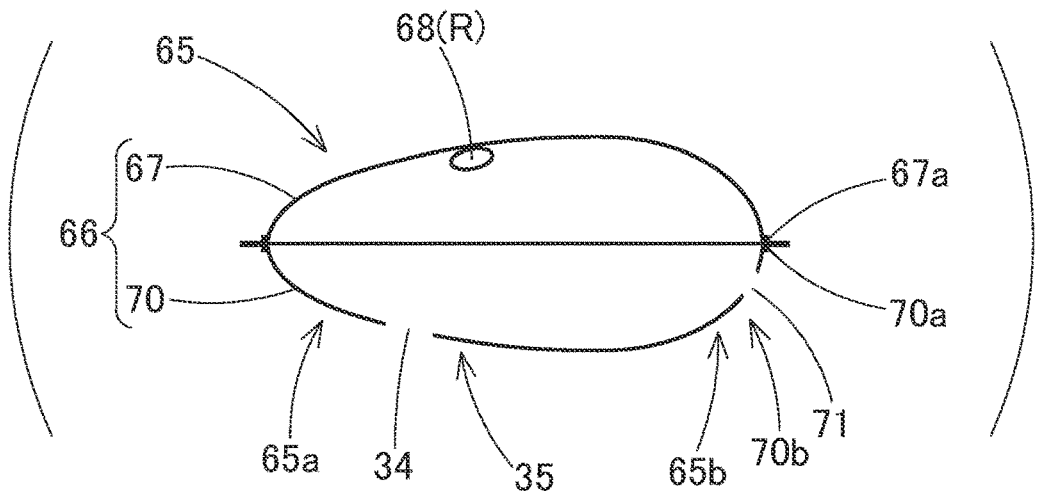

FIG. 7
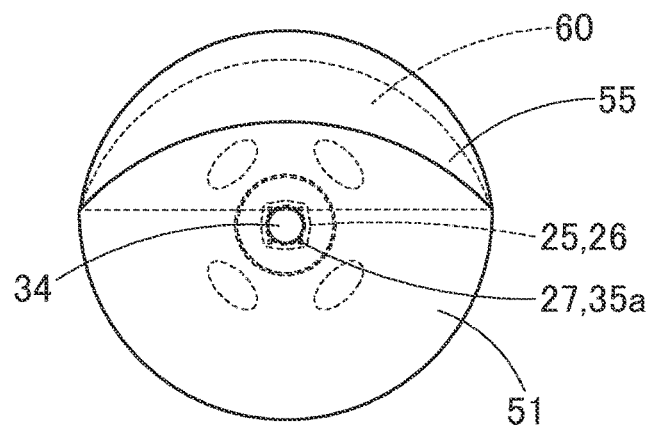
(A)
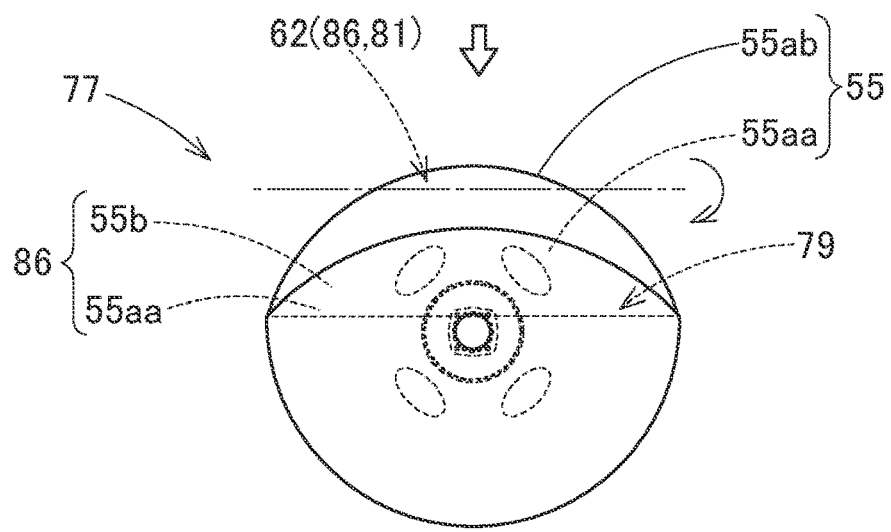
(B)
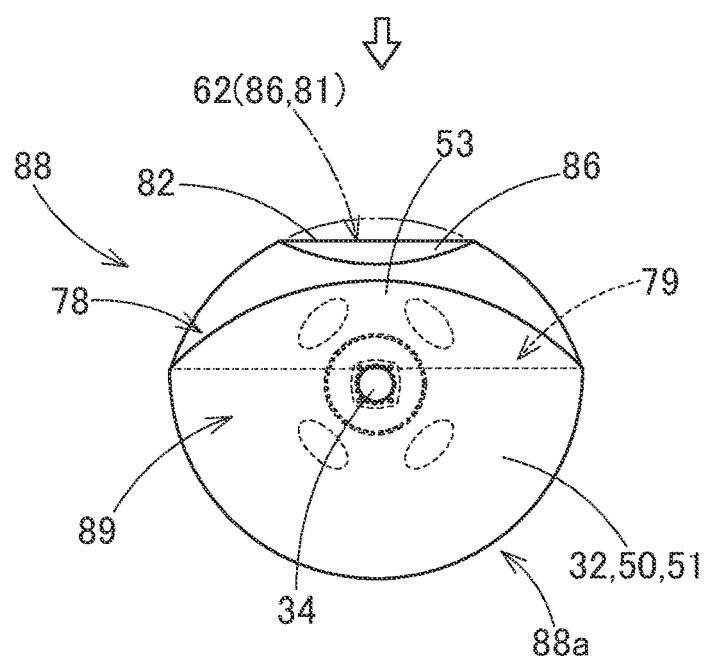
(C)

FIG. 9
(A)
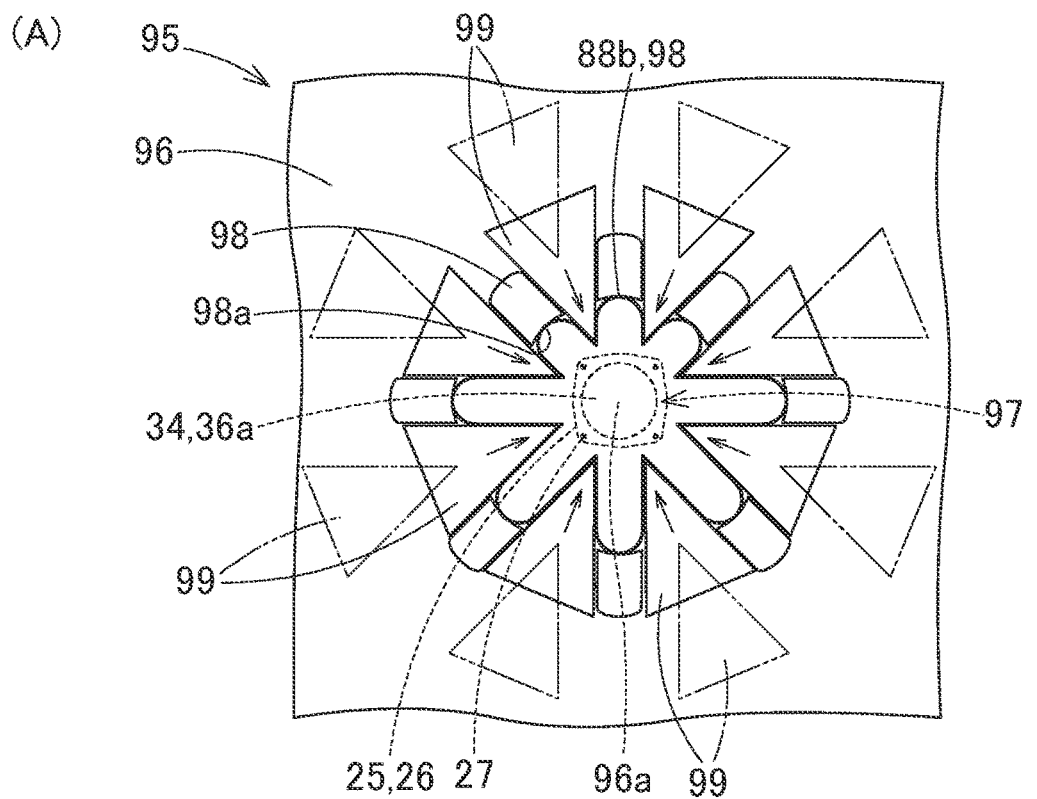
(B)
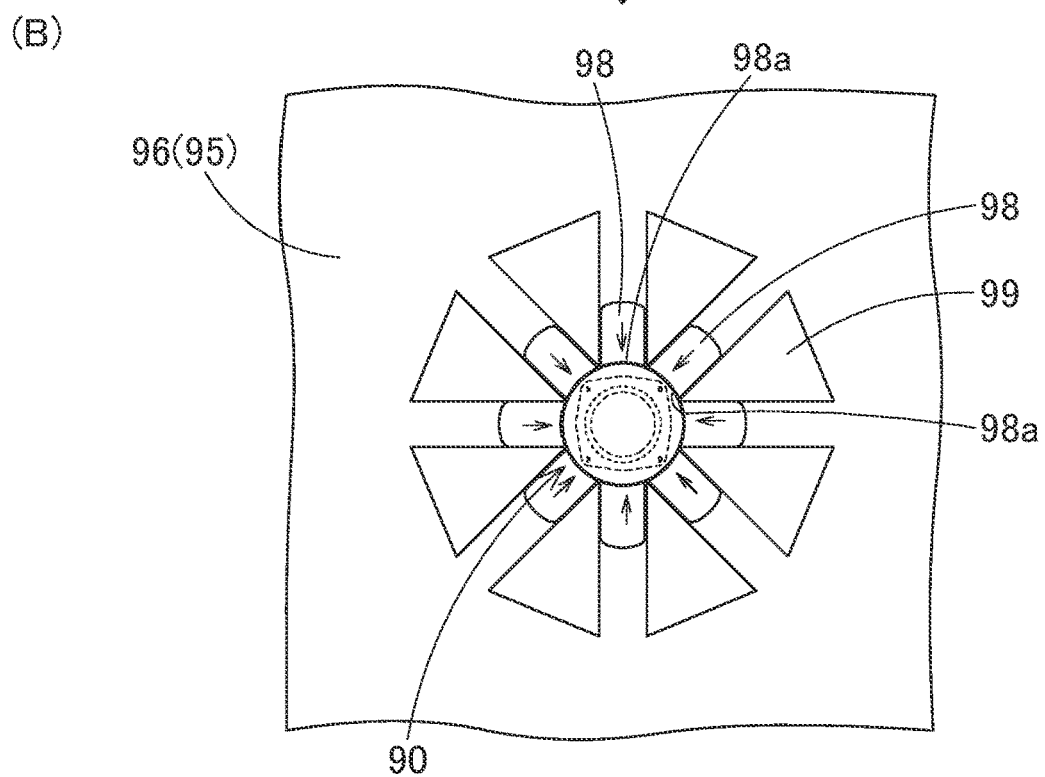

FIG. 10
(A)
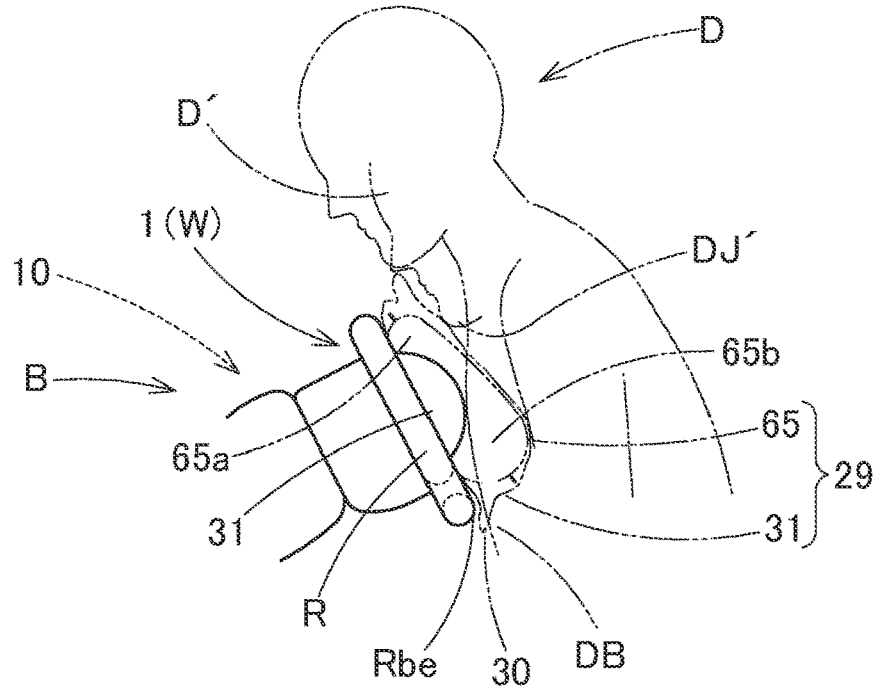
(B)
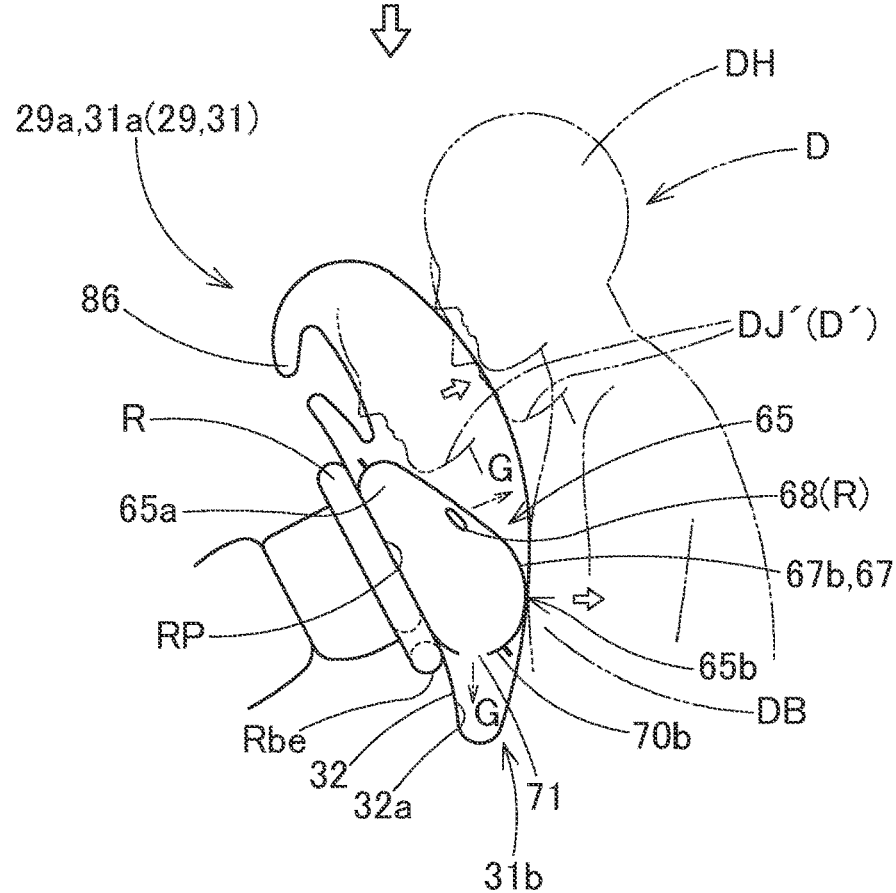

FIG. 12
(A)
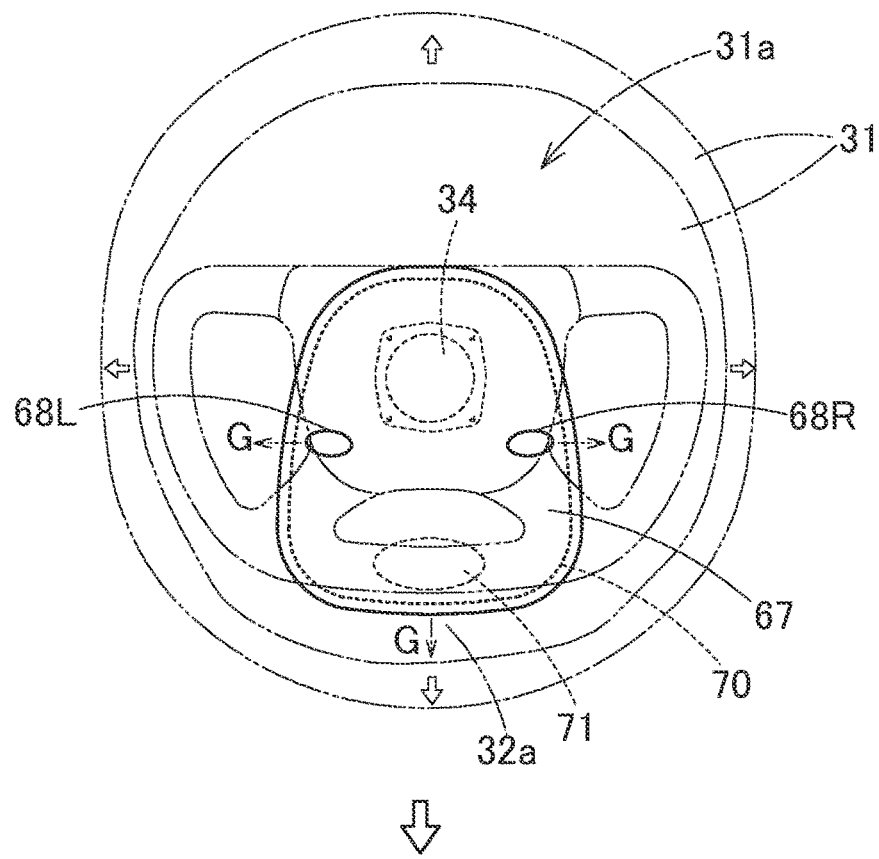
(B)
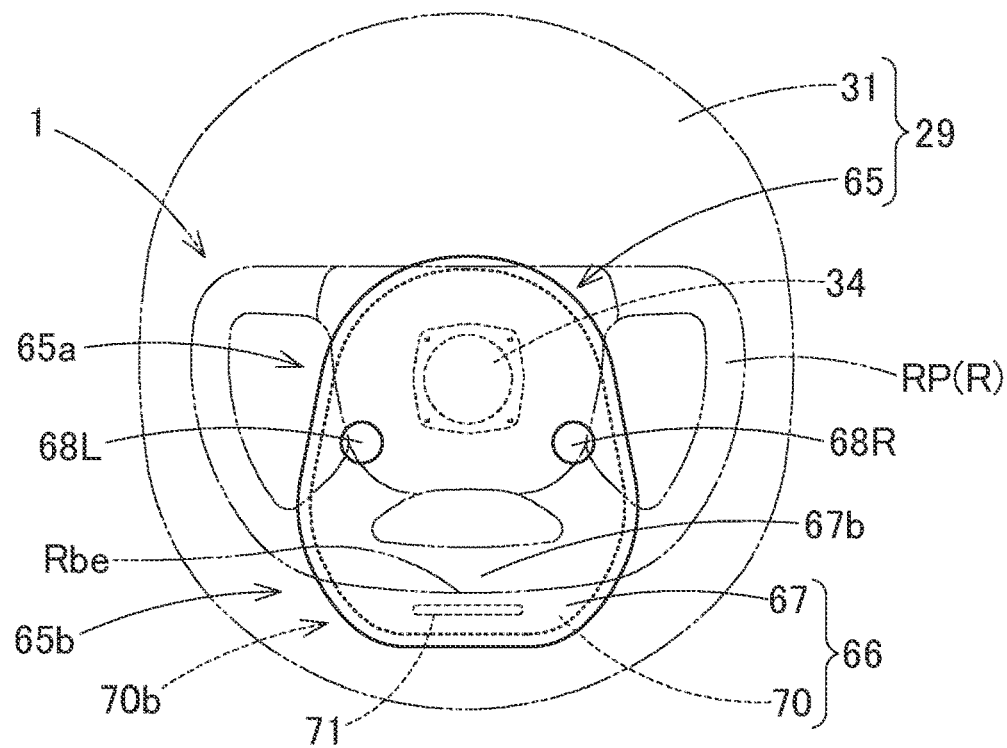

AIRBAG DEVICE FOR A DRIVER'S SEAT

CROSS REFERENCE TO RELATED APPLICATIONS

The Present application claims priority from Japanese Patent Application No. 2020-063221 of Ishii et al., filed on Mar. 31, 2020, the entire disclosure of which is incorporated herein by reference.

BACKGROUND

1. Technical Field

The present disclosure relates to an airbag device for a driver's seat including an airbag that includes an outer bag constituting an outer shell of the airbag as inflated, and an inner bag that is configured to be inflated inside the outer bag and includes a supply port for supplying the outer bag with an inflation gas.

2. Description of Related Art

As disclosed in JP2012-006598A and JP2018-122798A, a known airbag device for a driver's seat mounted on a steering wheel includes an airbag that is folded and stored in a boss section disposed in a vicinity of the center of a ring portion for gripping for steering. An outer shell of the airbag as inflated includes a driver-side wall for receiving the driver, and a vehicle-side wall that is supported by a ring surface of the ring portion inclined downward to the rear. The vehicle-side wall and driver-side wall are joined together by their outer circumferential edges. The vehicle-side wall includes an inlet port for receiving an inflation gas in a vicinity of the center, and a mounting portion in the periphery of the inlet port, by which mounting portion the airbag is secured to the boss section of the steering wheel. The airbag includes an outer bag that constitutes the outer shell, and an inner bag that is configured to be inflated inside the outer bag and includes a supply port for supplying the outer bag with the inflation gas. The outer bag and inner bag share the inlet port and mounting portion. In the airbag device for a driver's seat disclosed in JP2012-006598A, the inner bag is used to press the outer bag against the ring surface quickly at deployment in order to prevent the outer bag from floating up. In the airbag device for a driver's seat disclosed in JP2018-122798A, the inner bag as fully inflated and having a steady internal pressure is used to support the outer bag that is supported by the ring surface only by a small area.

In the above described airbag devices, however, in case the airbag device is actuated when the driver is sitting in proximity to the steering wheel, it will be likely that the driver moves forward and his thoracic region is immediately brought into engagement with a rear end portion of the ring portion if the outer bag and inner bag are still in the course of deployment. It would be desirable that an airbag in the course of deployment is able to protect the driver adequately even if the driver is positioned in proximity to the ring portion when the airbag device is actuated.

SUMMARY

An exemplary embodiment of the disclosure relates to an airbag device for a driver's seat adapted to be mounted on a steering wheel that includes a ring portion for gripping for steering operation, and a boss section disposed in a vicinity of a center of the ring portion, and in which a ring surface composed of an upper surface of the ring portion is inclined downward to the rear. The airbag device includes an airbag that is folded and stored in the boss section of the steering wheel and configured to be inflated and deployed for protecting a driver. The airbag includes an outer bag that constitutes an outer shell of the airbag as inflated, and an inner bag that is configured to be inflated inside the outer bag. The outer bag includes a driver-side wall for receiving the driver, and a vehicle-side wall that is configured to be supported by the ring surface of the ring portion at airbag deployment, and includes an inlet port of an inflation gas in a vicinity of a center thereof, and a mounting portion on the boss section in a periphery of the inlet port. The vehicle-side wall is jointed with the driver-side wall by respective outer circumferential edges. The inner bag shares the inlet port and mounting portion with the outer bag and includes at least one supply port for supplying the inflation gas to the outer bag. The inner bag is configured to complete inflation prior to the outer bag, and the outer bag is configured to be inflated with the inflation gas supplied from the supply port of the inner bag. The inner bag is configured to be inflated into such a shape that a rear portion protrudes farther rearward than a rear end portion of the ring surface, and that a height from the ring surface is greater in the rear portion than in a front portion.

BRIEF DESCRIPTION OF DRAWINGS

FIG. 3 is a schematic perspective view of an airbag of the airbag device in accordance with the exemplary embodiment as inflated by itself.

FIG. 7 illustrates the folding process for forming the initial folded form in schematic plan.

FIGS. 8 and 9 illustrate a radial folding for forming a folded body of the airbag in schematic plan.

FIGS. 10 and 11 illustrate a behavior of the airbag device in accordance with the exemplary embodiment as actuated in order.

FIG. 12 illustrates a deployment behavior of the inner bag of the airbag device in accordance with the exemplary embodiment in schematic plan.

DETAILED DESCRIPTION

Exemplary embodiments of the invention are described below with reference to the accompanying drawings. However, the invention is not limited to the embodiments disclosed herein. All modifications within the appended claims and equivalents relative thereto are intended to be encompassed in the scope of the claims.

Especially, in the following detailed description, for purposes of explanation, numerous specific details are set forth in order to provide a thorough understanding of the disclosed embodiments. It will be apparent, however, that one or more embodiments may be practiced without these specific details.

Figure 1:
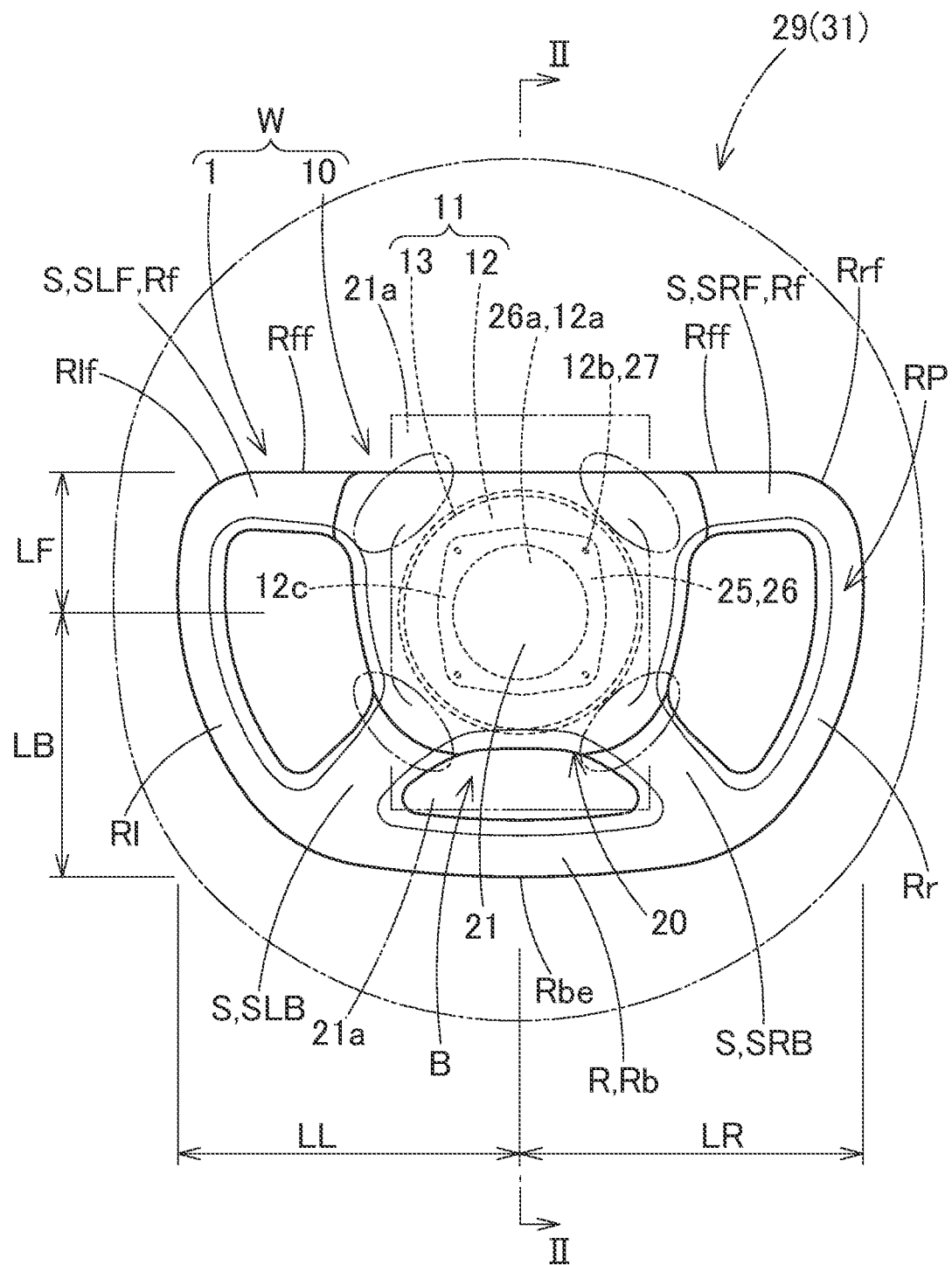
FIG. 1 is a schematic plan view of a steering wheel equipped with an airbag device for a driver's seat in accordance with an exemplary embodiment.
Figure 2:
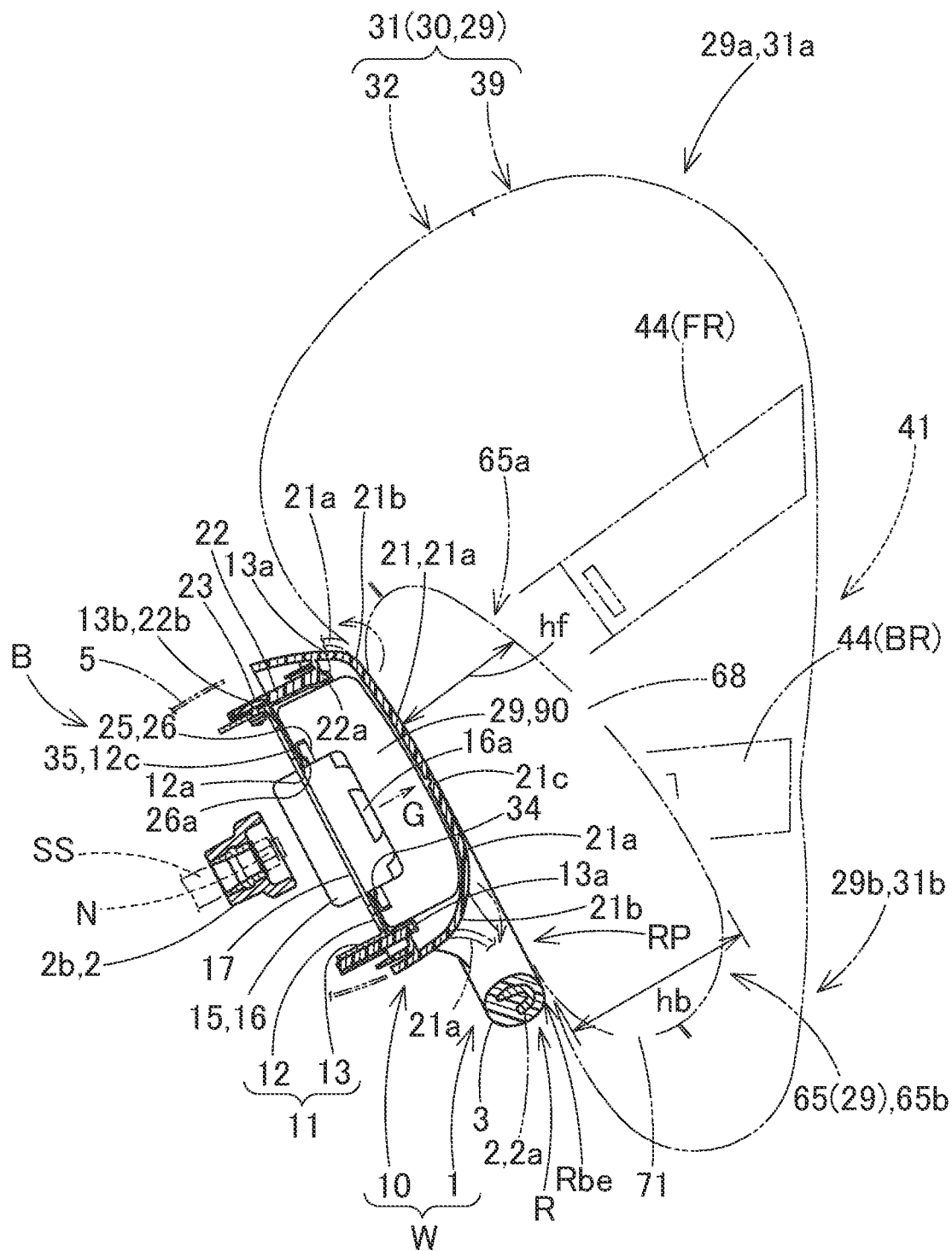
FIG. 2 is a schematic vertical sectional view taken along line II-II of FIG. 1.

Referring to FIGS. 1 and 2, an airbag device 10 for a driver's seat in accordance with an exemplary embodiment is mounted on a boss section B of a steering wheel W of a vehicle. The steering wheel W includes a steering-wheel body 1 and an airbag device 10. The steering-wheel body 1 includes a ring portion R for gripping for steering operation, the boss section B disposed at the center of the ring portion R, and a plurality of spokes S that interconnect the ring portion R and boss section B.

In this specification, unless otherwise specified, up-down, left-right, and front-back directions of the airbag device 10, an airbag 29, the steering wheel W and so on are based on the vehicle as steered straight ahead with the steering wheel W nut N fixed and connected to a steering shaft SS (FIG. 2). Specifically, the up and down direction corresponds to an up and down direction extending along an axial direction of the steering shaft SS. The left and right direction corresponds to a left and right direction of the vehicle which is orthogonal to the axial direction of the steering shaft SS. The front and rear direction generally corresponds to a front and rear direction of the vehicle which is orthogonal to the axial direction of the steering shaft SS.

Referring to FIG. 1, in the steering-wheel body 1 in accordance with the exemplary embodiment, the spokes S include four spokes SLF, SLB, SRF and SRB that respectively extend in a left and right direction in the front and rear portions of the steering-wheel body 1. The ring portion R is formed generally into a U shape in a plan view that interconnects the spokes S at the rear of the boss section B. A width (front-side dimension) LF in a front and rear direction of a portion of the ring portion R to the front from the boss section B is smaller than respective widths LL, LR (a left-side dimension LL and a right-side dimension LR) in the left and right direction of portions of the ring portion R to the left and right from the boss section B. Further, a width (rear-side dimension) LB in the front and rear direction of a portion of the ring portion R to the rear from the boss section B is also smaller than the respective widths LL, LR in the left and right direction of the portions of the ring portion R to the left and right from the boss section B, though it is greater than the front-side dimension LF. The spokes SLF, SRF are grippable for steering, therefore also function as a front portion Rf of the ring portion R in vicinities of a left portion Rl and a right portion Rr of the ring portion R.

Referring to FIG. 2, the steering-wheel body 1 includes a skeleton 2 of such a shape that the ring portion R, the boss section B and the spokes S are interconnected, and a cladding layer 3 that covers the skeleton 2 at the ring portion R and portions of the spokes S in a vicinity of the ring portion R. The cladding layer 3 is fabricated from urethane or the like. The skeleton 2 includes a ring-core portion 2a that forms the ring portion R, a boss-core portion 2b that forms the boss section B and is connected with the steering shaft SS, and spoke-core portions (not-shown) that forms the spokes S and interconnect the ring-core portion 2a and boss-core portion 2b.

The steering-wheel body 1 further includes a lower cover 5 in the underside of the boss section B.

The ring portion R of the steering wheel W as mounted on the vehicle is so disposed that a rear portion Rb is located farther downward than a front portion Rf for easy steering. Accordingly, a ring surface RP, which is composed of an upper surface of the ring portion R, is inclined downward to the rear, and faces obliquely upward and rearward.

The airbag device 10 includes a folded body 90, which is a folded form of an airbag 29, having a generally pot-like shape, an inflator 15 for feeding the airbag 29 with an inflation gas, an airbag cover (or pad) 20 that covers the folded body 90 and is disposed on top of the boss section B of the steering wheel W, and a bag holder (or case) 11 that holds and stores the folded body 90 (i.e. airbag 29) to mount the folded body 90 on the boss section B. The airbag cover 20 is fabricated from synthetic resin and the bag holder 11 is made from metal. The bag holder 11 holds not only the folded body 90 but also the inflator 15 and airbag cover 20.

A retainer 25 formed of sheet metal into a square annular shape is disposed inside of and on the bottom of the folded body 90 for mounting the airbag 29 on the bag holder 11. The airbag 29 is firstly folded into an initial folded form 88 (see (D) of FIG. 6 and (C) of FIG. 7) with the retainer 25 mounted thereon, then folded into the folded body 90 as shown in (B) of FIG. 9, then mounted on the bag bolder 11. The retainer 25 includes a square annular bottom wall 26 that includes, at the four corners, four bolts 27 extending downwardly. The bottom wall 26 includes an opening 26a for receiving a later-described body 16 of the inflator 15 at the center.

The inflator 15 includes a body 16 that has a pot-like shape and a flange 17 that protrudes from an outer circumference of the body 16 in a square annular shape. The flange 17 is provided with not-shown through holes for receiving the bolts 27 of the retainer 25. The body 16 includes a plurality of gas discharge ports 16a for emitting an inflation gas G in the portion disposed farther upward than the flange 17.

The airbag cover 20 is fabricated from synthetic resin such as thermoplastic elastomer of olefin (TPO), and disposed on top of the boss section B in a vicinity of the center of the steering wheel W. The airbag cover 20 includes a ceiling wall 21 that covers the folded body 90 as stored inside the boss section B and a side wall 22 that extends downwardly from an underside of the ceiling wall 21 in a tubular shape and covers the circumference of the folded body 90.

The ceiling wall 21 includes two doors 21a which are configured to open forward and rearward when pushed by the airbag 29 as inflated. The doors 21a have hinge portions 21b at the front and rear edges, and a thinned breakable portion 21c is formed around the doors 21a generally in a H shape as viewed from above.

The side wall 22 of the airbag cover 20 includes a plurality of retaining edges 22a to be retained by later-described retaining portions 13a of a supporting portion 13 of the bag holder 11, and connecting holes 22b for receiving rivets 23 to fasten the side wall 22 and the supporting portion 13 together.

The bag holder 11 is made of sheet metal. The bag holder 11 holds the folded body 90, the inflator 15, and airbag cover 20, and mounts the airbag device 10 on the steering-wheel body 1 of the steering wheel W with the use of not-shown, at least one connecting bracket. The bag holder 11 includes a base plate 12 having a generally annular shape, and the supporting portion 13 that protrudes upwardly and downwardly from the outer circumferential edge of the base plate 12.

The base plate 12 is provided with, at the center, a generally round insert hole 12a for receiving the inflator body 16 from below and communicating with a later-described inlet port 34 of the airbag 29. In the periphery of the insert hole 12a, there are disposed four through holes 12b for receiving the bolts 27 of the retainer 25. This peripheral region of the insert hole 12a provided with the through holes 12b serves as a mounting seat 12c on which the folded body 90 and inflator 15 are mounted with the use of the retainer 25.

As described above, the supporting portion 13 of the bag holder 11 is provided with a plurality of retaining portions 13a to be coupled with and hold the side wall 22 of the airbag cover 20, and connecting holes 13b for receiving the rivets 23.

Figure 11:
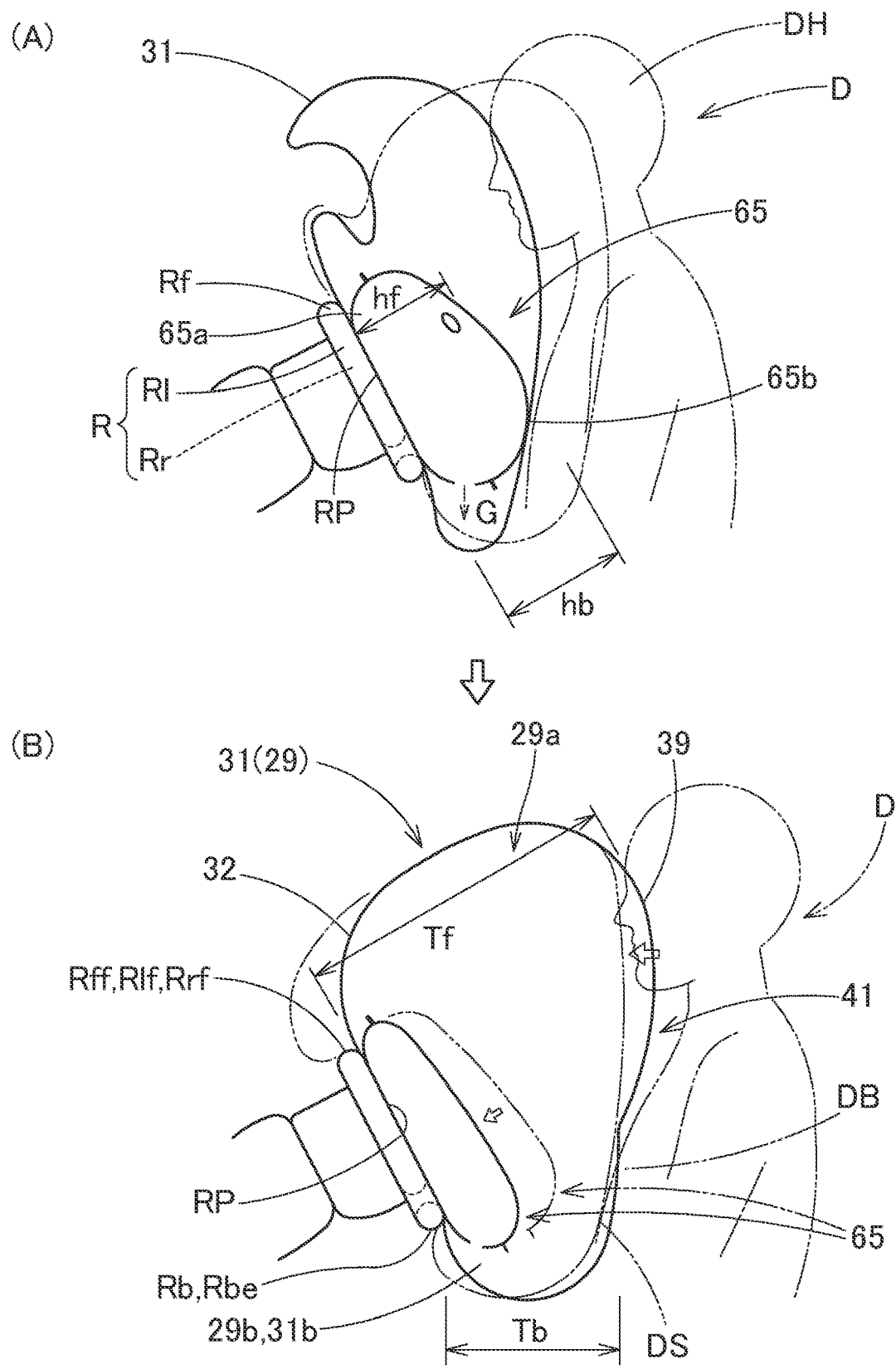

As can be seen in FIGS. 1 and 2 (with dashed-and-double-dotted lines) and (B) of FIG. 11, the airbag 29 is configured inflatable into a generally circular board shape a front portion 29a of which has a greater thickness Tf than a thickness Tb of a rear portion 29b. As shown in FIGS. 2 and 3, an outer shell 30 of the airbag 29 is composed of an outer bag 31, and includes a vehicle-side wall 32 that is supported by the ring surface RP of the ring portion R of the steering wheel W at airbag deployment, and a driver-side wall 39 whose outer circumferential edge 40 is continuous with an outer circumferential edge 33 of the vehicle-side wall 32. The vehicle-side wall 32 includes an inlet port 34 of an inflation gas G in a vicinity of the center, and the driver-side wall 39 is disposed over the inlet port 34 and opposed to the vehicle-side wall 32.

Figure 4:
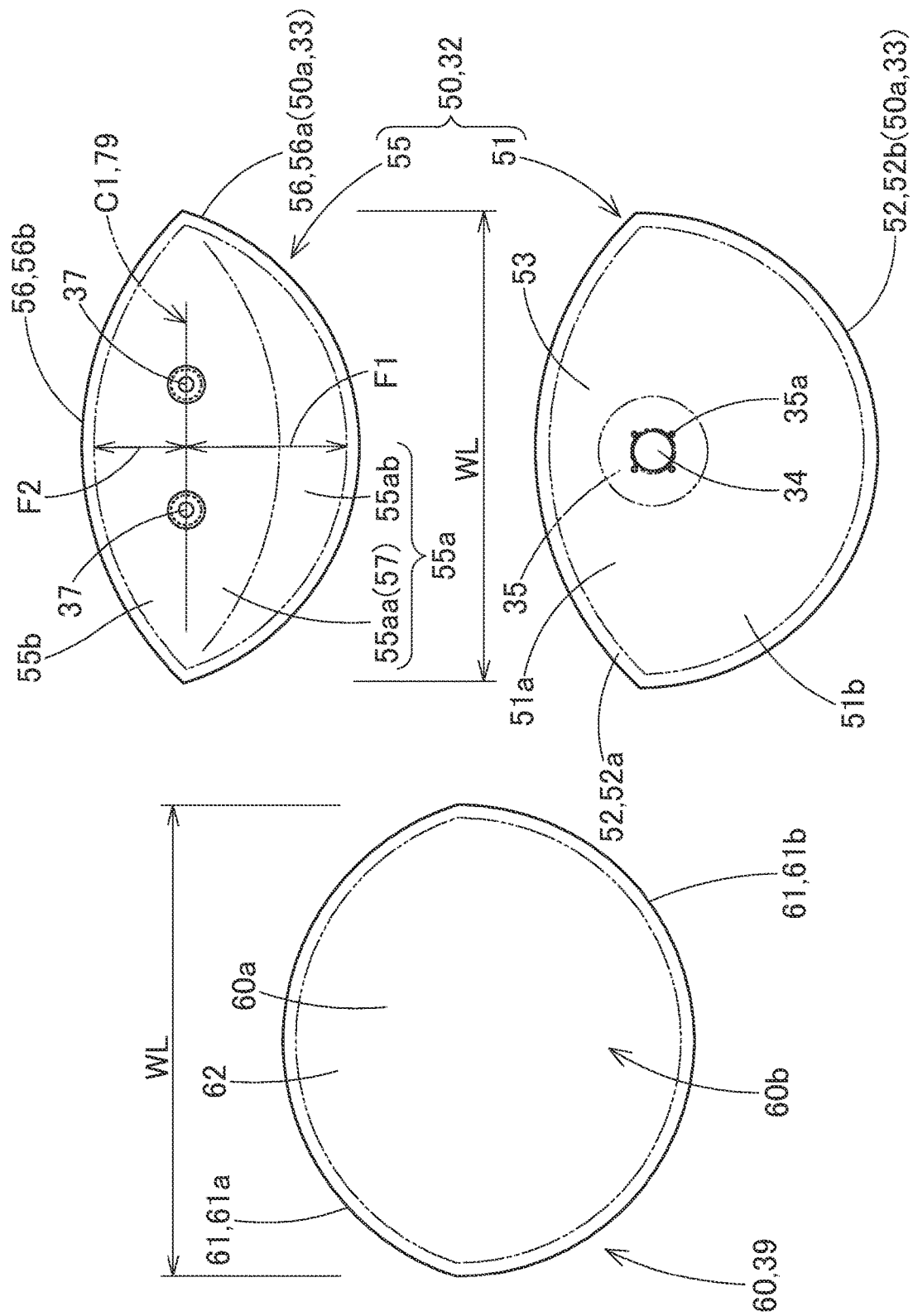
FIG. 4 depicts components of the airbag of the airbag device in accordance with the exemplary embodiment in plan, especially depicts components of an outer bag.

The inlet port 34 has a round shape, and a peripheral portion of the inlet port 34 serves as a mounting portion 35 on the bag holder 11. The mounting portion 35 includes four through holes 35a for receiving the bolts 27 of the retainer 25, as can be seen in FIGS. 3 and 4. The mounting portion 35 is a generally square annular region to butt against an underside of the bottom wall 26 of the retainer 25 by the inner surface and be secured to the mounting seat 12c of the bag holder 11.

The airbag 29 includes, in addition to the outer bag 31 that constitutes the outer shell 30 at deployment, an inner bag 65 that is configured to be inflated inside the outer bag 31 and includes at least one supply port 68 (L, R), 71 for supplying the outer bag 31 with an inflation gas G. The outer bag 31 and inner bag 65 share the inlet port 34 and the mounting portion 35 having the through holes 35a. The airbag 29 of the illustrated embodiment further includes four tethers 44 (44FL, 44FR, 44BL, 44BR) that are configured to control a distance between the inlet port 34 and driver-side wall 39 at airbag deployment.

Figure 5:
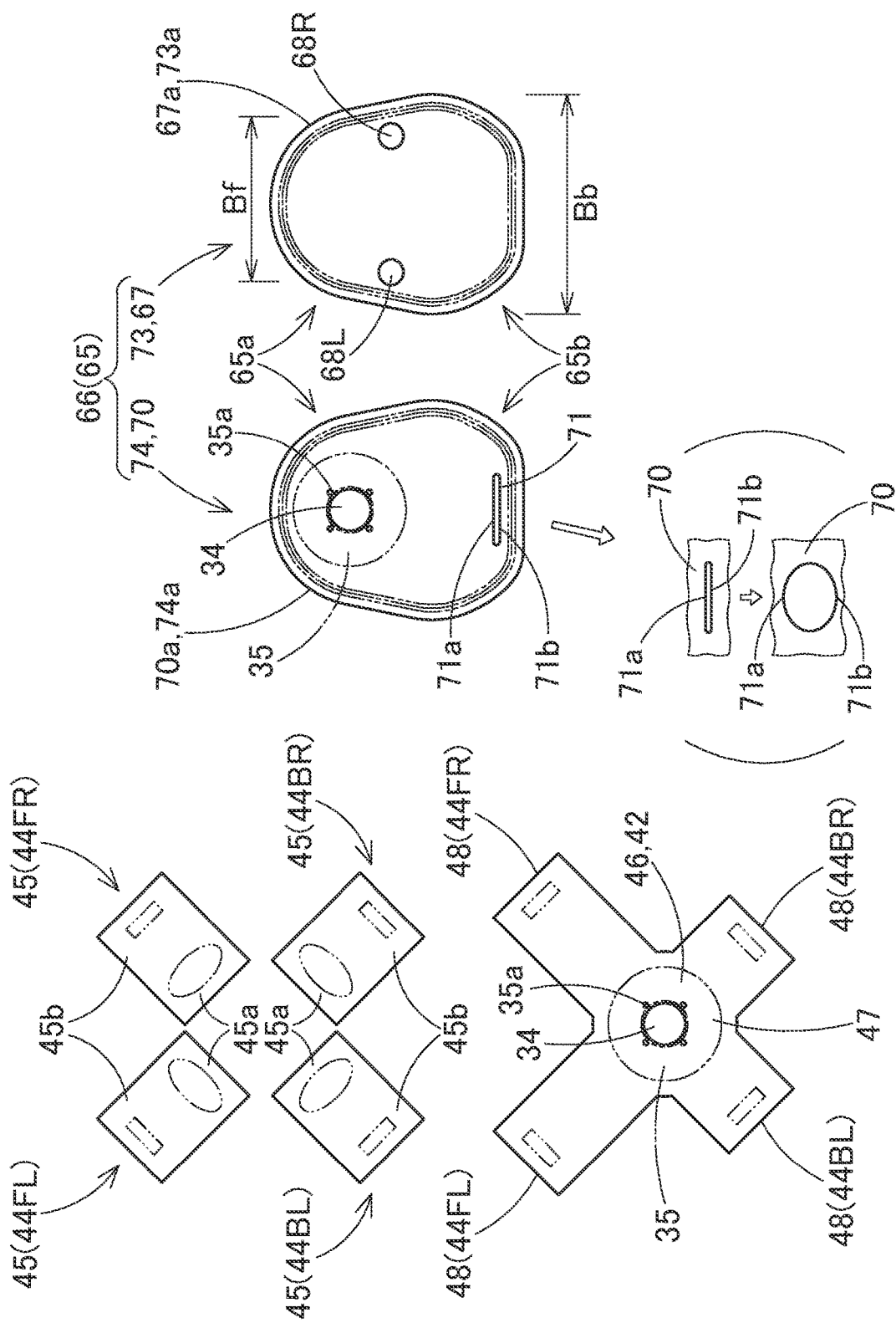
FIG. 5 depicts components of the airbag of the airbag device in accordance with the exemplary embodiment in plan, especially depicts components of an inner bag and tethers.

As can be seen in FIGS. 3 and 5, an outer circumferential wall 66 of the inner bag 65 as inflated includes an upper wall 67 that is opposed to the driver-side wall 39 of the outer bag 31, and a lower wall 70 that is opposed to the vehicle-side wall 32 with the outer circumferential edge 70a joined with an outer circumferential edge 67a of the upper wall 67. The lower wall 70 includes the inlet port 34 and the mounting portion 35 having the through holes 35a. The upper wall 67 and the lower wall 70 have an identical outer shape, and the inner bag 65 is formed by joining the outer circumferential edges 67a and 70a of the upper wall 67 and lower wall 70 together. In a flatly developed state, the inner bag 65 has a generally trapezoidal shape in which a width Bb in a left and right direction of the rear portion 65b is greater than a width Bf in the left and right direction of the front portion 65a. Accordingly, in the inner bag 65 as fully inflated, a thickness hb of the rear portion 65b is greater than a thickness hf of the front portion 65a, as can be seen in FIG. 2 and (A) of FIG. 11.

Referring to FIGS. 3 and 12, as the supply ports to the outer bag 31, the inner bag 65 includes a lower supply port 71 that is disposed at the center in a left and right direction of a rear portion 70b of the lower wall 70, and two upper supply ports 68 (L, R) that are disposed at left and right portions of an area in the upper wall 67 farther forward than the lower supply port 71. The lower supply port 71 is formed into an elliptical shape elongated in a left and right direction, while the upper supply ports 68L, 68R are each formed into a circular shape.

The lower supply port 71 as opened has a greater opening area than a total of opening areas of the upper supply ports 68L, 68R as opened. The elliptical lower supply port 71 is formed into a generally circular shape at inflation of the inner bag 65 as can be seen in a parenthesis of FIG. 5, because opposite edges 71a, 71b are pulled apart from one another. That is why the lower supply port 71 has the greater opening area than the total of the opening areas of the upper supply ports 68L, 68R. In this specific embodiment, an area ratio among the lower supply port 71 and upper supply ports 68L, 68R as opened is approximately 3:1:1.

Referring to FIG. 4, the outer bag 31 is composed of a driver-side base cloth 60 forming the driver-side wall 39, and a vehicle-side base cloth 50 forming the vehicle-side wall 32. Further, the vehicle-side base cloth 50 includes a rear-side base cloth 51 provided with the inlet port 34 and a front-side base cloth 55 a rear arc portion 56b of which is joined with a front arc portion 52a of the rear-side base cloth 51. These base cloths 60, 51, 55 are formed of a fabric of such synthetic resin as polyamide, polyester or the like.

The driver-side base cloth 60 has a generally circular shape that includes a circular segment portion 60a in the front portion and a semi-circular portion 60b in the rear portion. An outer circumferential edge 61 of the driver-side base cloth 60 includes a semi-circular arc portion 61b in the rear portion and a circular arc portion 61a in the front portion.

The rear-side base cloth 51 of the vehicle-side base cloth 50 has a generally circular shape including a circular segment portion 51a in the front portion and a semi-circular portion 51b in the rear portion. An outer circumferential edge 52 of the rear-side base cloth 51 includes a semi-circular arc portion 52b in the rear portion and a circular arc portion 52a in the front portion. The semi-circular portion 51b of the rear-side base cloth 51 is identical to the semi-circular portion 60b of the driver-side base cloth 60 in outer shape, and the semi-circular arc portion 52b of the rear-side base cloth 51 is joined to the semi-circular arc portion 61b of the semi-circular portion 60b of the driver-side base cloth 60.

The front-side base cloth 55 has a generally oval shape including a circular segment portion 55a and a circular segment portion 55b respectively in the front portion and rear portion. An outer circumferential edge 56 of the front-side base cloth 55 has a circular arc portion 56a and a circular arc portion 56b respectively in the front portion and rear portion. In the outer shell 30 of the airbag 29 as deployed, the circular arc portion 56a is located in the front side and joined (sewn) together with the front circular arc portion 61a of the driver-side base cloth 60. Thus, the circular arc portion 56a is identical to the circular arc portion 61a in outer shape. The circular arc portion 56b is located in the rear side of the front-side base cloth 55 in the outer shell 30 of the airbag 29 as deployed, and joined (sewn) together with the front circular arc portion 52a of the rear-side base cloth 51. Thus, the circular arc portion 56b is identical in shape to the circular arc portion 52a.

Referring to FIG. 4, the front-side base cloth 55 has a width WL in the left and right direction that is identical to those of the driver-side base cloth 60 and rear-side base cloth 51. A width F1 in the front and rear direction of a portion of the front-side base cloth 55 disposed farther to the front than a straight line C1 that connects left and right ends of the front-side base cloth 55 is greater than a width F2 in the front and rear direction of a portion of the front-side base cloth 55 disposed farther to the back than the straight line C1. Accordingly, when the front-side base cloth 55 is double-folded on a crease 79 formed on the straight line C1, the front circular segment portion 55a has an inner portion 55aa that overlaps with the rear circular segment portion 55b, and a protruding portion 55ab that protrudes from the rear circular segment portion 55b. The crease 79 forms a crease 79 of the initial folded form 88 as will be described later, and the inner portion 55aa and circular segment portion 55b form a later-described folded-in portion 78. The protruding portion 55ab and a front edge portion 62 of the driver-side base cloth 60 form a later-described folded-back portion 86.

The airbag 29 further includes two vent holes 37 in the front-side base cloth 55 of the vehicle-side wall 32.

The outer bag 31 internally includes, around the inlet port 34, a plurality of (four, in this embodiment) tethers 44 (44FL, 44FR, 44BL, 44BR) for regulating the thickness Tb (FIG. 11) of the rear portion 29a as inflated. As shown in FIG. 5, the tethers 44 are composed of four upper portions 45 each of which is joined to the driver-side wall 39, and a lower portion 46 that includes a mounting base portion 47 disposed in the periphery of the inlet port 34 of the vehicle-side wall 32 and four arms 48 extending radially from the mounting base portion 47. The tethers 44 are formed by jointing respective upper portions 45 and corresponding arms 48 of the lower portion 46. Each of the upper portions 45 is joined to the driver-side wall 39 by the upper end 45a, and joined to a leading end of the corresponding arm 48 by the lower end 45b. The mounting base portion 47 of the lower portion 46 concurrently acts as a reinforcing cloth 42 for enhancing heat resistance of the periphery of the inlet port 34. The tethers 44 (44FL, 44FR, 44BL, 44BR) are formed by jointing the arms 48 of the lower portion 46 extending from the inlet port 34 to the lower ends 45b of the upper portions 45. Lengths of the arms 48 are determined such that the tethers 44BL, 44BR in the rear side are shorter than the tethers 44FL, 44FR in the front side, as can be seen in FIGS. 2 and 5.

The airbag 29 (or outer bag 31) is designed so that the front portion 29a is inflated thicker than the rear portion 29b. More specifically, since the vehicle-side wall 32 in the front portion 29a has a longer film length than the driver-side wall 39 due to presence of the front-side base cloth 55 in front of the inlet port 34, and since the tethers 44BL, 44BR shorter than the tethers 44FL, 44FR regulate the thickness Tb of the rear portion 29b, the thickness Tf of the front portion 29a as inflated on the ring surface RP of the ring portion R is greater than the thickness Tb of the rear portion 29b as can be seen in (B) of FIG. 11. This deploys the driver-side wall 39 generally vertically for receiving the driver D.

The inner bag 65 is composed of an upper base cloth 73 for forming the upper wall 67 and a lower base cloth 74 for forming the lower wall 70, as can be seen in FIG. 5. The upper base cloth 73 and lower base cloth 74 are each formed of a fabric of such synthetic resin as polyamide and polyester.

For production of the airbag 29, the outer bag 31 and the inner bag 65 are each produced. To produce the outer bag 31, a rear-side base cloth 51 of the vehicle-side base cloth 50, which has not yet been provided with the inlet port 34 and through holes 35a, is firstly provided, and the reinforcing cloth 42 (i.e. the lower portion 46) is sewn thereto. Then the inlet port 34 and through holes 35a are formed in the rear-side base cloth 51 by punching. Reinforcing cloths for the vent holes are sewn to the front-side base cloth 55 which has not yet been provided with the vent holes 37, then the vent holes 37 are formed by punching therein. The upper ends 45a of the upper portions 45 of the tethers 44 are sewn to the driver-side base cloth 60.

Then the vehicle-side base cloth 50 is formed by sewing together the circular arc portion 56b which is the rear edge of the front-side base cloth 55 and the circular arc portion 52a which is the front edge of the rear-side base cloth 51. Subsequently, the vehicle-side base cloth 50 and driver-side base cloth 60 are mated with the outer surfaces facing each other, the semi-circular arc portion 52b which is the rear edge of the rear-side base cloth 51 and the semi-circular arc portion 61b which is the rear edge of the driver-side base cloth 60 are sewn together, and the circular arc portion 56a which is the front edge of the front-side base cloth 55 and the circular arc portion 61a which is the front edge of the driver-side base cloth 60 are sewn together. Thus, the outer bag 31 is formed. Thereafter, the outer bag 31 is turned inside out via the inlet port 34 so that seam allowances may not be exposed outside, then the lower ends 45b of the upper portions 45 of the tethers 44 and arms 48 of the lower portion 36 are taken out from the inlet port 34, then sewn together, respectively. If then the tethers 44 are put back into the outer bag 31, the outer bag 31 is completed.

To produce the inner bag 65, a lower base cloth 74, which has not yet been provided with the inlet port 34 and through holes 35a, is provided firstly, then the inlet port 34, the through holes 35a, and the lower supply port 71 are formed in the lower base cloth 74 by punching. An upper base cloth 73, which has not yet been provided with the upper supply ports 68L, 68R, is provided, and the upper supply ports 68L, 68R are formed in the upper base cloth 73. If the outer circumferential edges 73a and 74a of the upper base cloth 73 and lower base cloth 74 are sewn together, the inner bag 65 is completed. The inner bag 65 thus produced is stored inside the outer bag 31 such that the inlet ports 34 and through holes 35a are matched in position. The retainer 25 is used to mate the positions of the inlet ports 34 and through holes 35a of the inner bag 65 and outer bag 31. Specifically, the retainer 25 is stored inside the inner bag 65 so that the bolts 27 go through the respective through holes 35a in the inner bag 65 and outer bag 31.

The airbag 29 thus produced is firstly folded into the initial folded form 88, then folded into the folded body 90.

Figure 6:
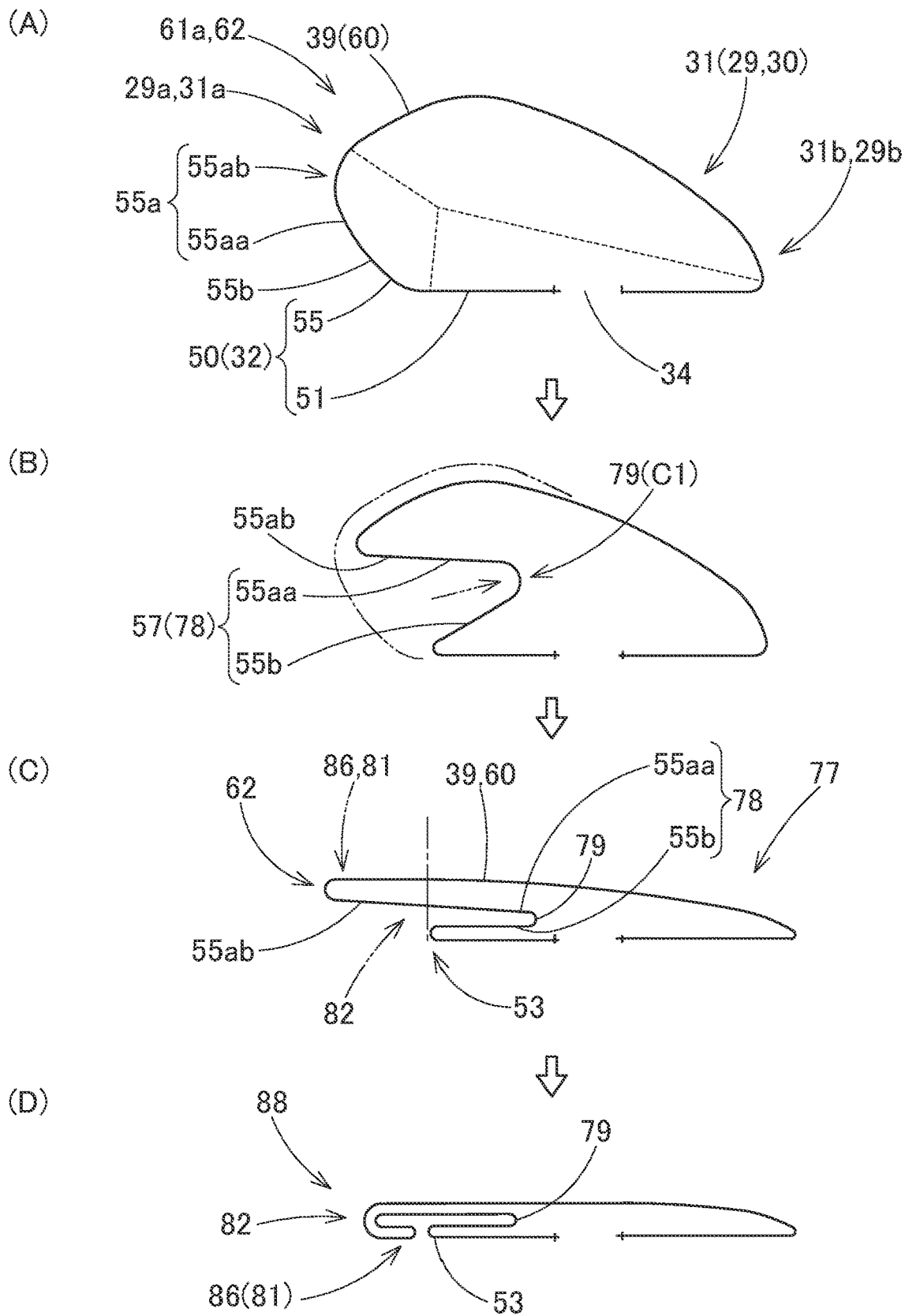
FIG. 6 illustrates a folding process for forming an initial folded form of the airbag in schematic vertical sectional views.

To form the initial folded form 88, a preparatory form 77 is formed firstly as shown in (A) to (C) of FIG. 6 and (A) and (B) of FIG. 7. The preparatory form 77 is formed by folding the front-side base cloth 55 of the vehicle-side base cloth 50 forming the vehicle-side wall 32 on the crease 79 extending in the left and right direction, and placing the driver-side wall 39 over the vehicle-side wall 32 flatly. The portion of the front-side base cloth 55 folded inward and rearward (i.e. toward the inlet port 34), which constitutes the front portion 29a of the airbag 29 (or outer bag 31) as inflated, forms a folded-in portion 78. The preparatory form 77 is a form in which the folded-in portion 78 lies beneath a front edge portion 62 of the driver-side wall 39 as laid flat. The crease 79 of the folded-in portion 78 is formed on the boundary between the front circular segment portion 55a and rear circular segment portion 55b of the front-side base cloth 55, i.e. on the straight line C1. The rear circular segment portion 55b lies in the lower side, and the inner portion 55aa of the front circular segment portion 55a lies on and overlaps with the rear circular segment portion 55b.

Thereafter, as can be seen in (C) and (D) of FIG. 6 and (B) and (C) of FIG. 7, the front edge portion 62 of the driver-side wall 39 that adjoins the folded-in portion 78 of the preparatory form 77 is folded, on a crease 82, toward a front end 53 of the vehicle-side wall 32 adjoining the folded-in portion 78 on the side of the inlet port 34. The front edge portion 62 thus folded back forms a folded-back portion 78. The initial folded form 88 is thus formed.

Figure 8:
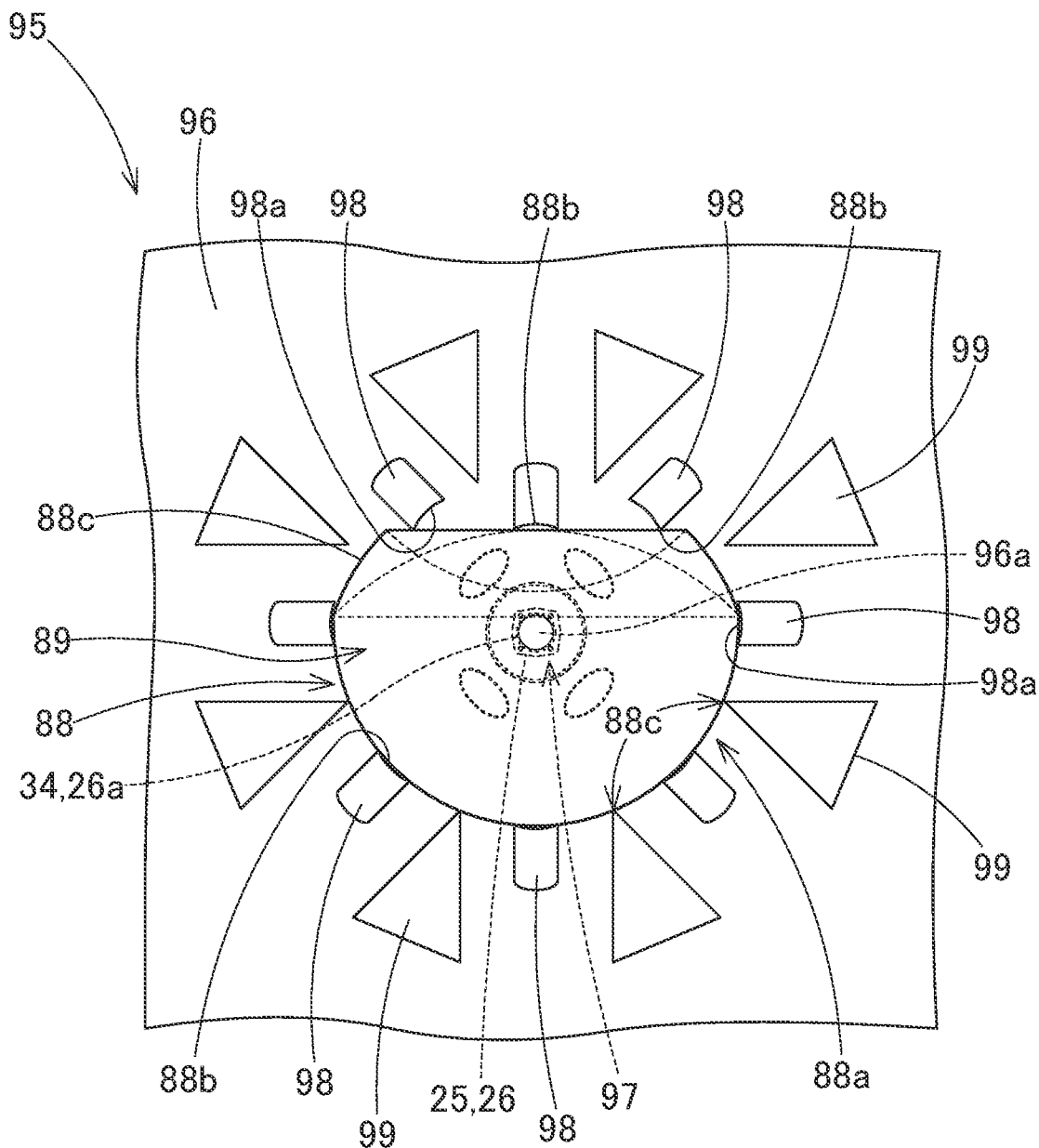

The folded body 90 is formed by applying radial folding to the initial folded form 88, as illustrated in FIGS. 8 and 9. The radial folding is a method of folding that gathers a generally annular circumjacent portion 89 of the initial folded form 88 that is disposed between the inlet port 34 and an outer peripheral edge 88a of the initial folded form 88 together on the inlet port 34 by bringing a plurality of sector-shaped portions of the initial folded form 88 that extend from the inlet port 34 to the outer peripheral edge 88a close to the inlet port 34. In the illustrated embodiment, sixteen portions radially disposed about the inlet port 34 are gathered up towards the inlet port 34.

A bag-folding device 95 shown in FIGS. 8 and 9 is used to conduct the radial folding. The bag-holding device 95 includes a base plate (or bottom base plate) 96 and two kinds of pushing jigs 98 and 99 that are disposed on the base plate 96 and configured to move towards the center of the base plate 96. Each set of the pushing jigs 98 and 99 includes eight jigs. The base plate 96 includes, at the center 96a on the upper side, a setting section 97 in which the bolts 27 of the retainer 25 protruding from the initial folded form 88 are set.

The eight pushing jigs 98 are configured to grip eight portions 88b in the outer peripheral edge 88a of the initial folded form 88 and push or cram the same towards the center 96a of the base plate 96, as can be seen in FIG. 9. Each of the pushing jigs 98 is provided, in the surface facing toward the setting section 97, a forming surface 98a that is shaped to correspond to a curved surface of the outer circumference of the folded body 90 having a generally pot-like shape. Each of the pushing jigs 99 is formed into a generally triangular plate that is tapered toward the setting section 97.

Although not illustrated in the drawings, the bag-folding device 95 further includes a ceiling base plate that regulates the height of the initial folded form 88 while being compacted by the pushing jigs 98 and 99 and helps form the folded body 90 into a generally pot-like shape.

Operation of the bag-folding device 95 is now described. The airbag 29 in the initial folded form 88 is placed on the bottom base plate 96 by setting the bolts 27 in the setting section 97, then the not-shown ceiling base plate is positioned at a predetermined height from the setting section 97 of the bottom base plate 96 (at the same height as that of the folded body 90). Then as shown in FIG. 8, the pushing jigs 98 and 99 are moved towards the setting section 97 from farther positions so that the pushing jigs 98 grip or hold the predetermined eight grip portions 88b of the outer peripheral edge 88a of the initial folded form 88. Thereafter, as can be seen in (A) of FIG. 9, the pushing jigs 99 are moved towards the setting section 97 (i.e. toward the inlet port 34) first to push or compress eight pushing portions 88c of the outer peripheral edge 88a of the initial folded form 88 toward the setting section 97, leaving the grip portions 88b gripped by the pushing jigs 98 as they are. Subsequently, the grip portions 88b are released from gripping by the pushing jigs 98, then the pushing jigs 98 are moved towards the setting section 97 to cram the eight portions 88b towards the setting section 97, as shown in (B) of FIG. 9. Thus the folded body 90, which has a pot-like shape, is formed.

In order to keep the folded-up configuration, a shape-keeping treatment is applied to the folded body 90. Specifically, the folded body 90 is firstly subjected to hot compression molding using a heated mold, then subjected to cold compression molding using a mold of normal temperature.

After undergoing the shape-keeping treatment, the folded body 90 is wrapped by a not-shown wrapping member. Assembling of the airbag device 10 is now described. Firstly, the folded body 90 is set inside the side wall 22 of the airbag cover 20. Then the supporting portion 13 of the bag holder 11 and the side wall 20 of the airbag cover 20 are coupled by inserting the bolts 27 of the retainer 25 protruding from the folded body 90 through the through holes 12b of the bag holder 11, bringing the retaining edges 22a of the airbag cover 22 into engagement with the retaining portions 13a of the bag holder 11, and inserting the rivets 23 through the connecting holes 13b and 22b. Subsequently, the body 16 of the inflator 15 is set in the insert hole 12a of the bag holder 11 from below such that the bolts 27 of the retainer 25 protruding from the bag holder 11 penetrate the flange 17 of the inflator 15. If then the bolts 27 are fastened with not-shown nuts, the folded body 90 and inflator 15 are secured to the bag holder 11 which has been coupled with the airbag cover 20. Thus the airbag device 10 is assembled.

The airbag device 10 thus assembled is mounted on the steering-wheel body 1 of the steering wheel W as mounted on the steering shaft SS, with the use of not-shown mounting brackets extending from the bag holder 11. Thus the steering wheel W is completed as well as the airbag device 10 is mounted on the vehicle together with the steering wheel W.

When the airbag device 10 is mounted on the steering-wheel body 1, not-shown lead wires are connected to the inflator 15 for feeding of an actuating signal.

When an actuating signal is fed to the inflator 15 of the airbag device 10 as mounted on board, the inflator 15 emits an inflation gas G from the gas discharge ports 16a, so that the airbag 29 is inflated with the gas G, breaks the not-shown wrapping member, pushes and opens the doors 21a of the ceiling wall 21 of the airbag cover 20, then protrudes from an opening formed by opening of the doors 21a. Thus the airbag 29 is deployed over the boss section B and the upper surface of the ring portion R, as indicated with dashed-and-double-dotted lines in FIGS. 1 and 2.

If the airbag device 10 in accordance with the exemplary embodiment is actuated when the driver D is sitting in proximity to the ring portion R of the steering wheel W as can be seen in (A) and (B) of FIG. 10, the inner bag 65 is inflated first. Since the inner bag 65 is inflated in such a manner that the rear portion 65b protrudes farther rearward than a rear end Rbe portion of the ring surface RP, the rear portion 65b of the inner bag 65 pushes the thoracic region DB of the driver D rearward and apart from the rear end Rbe portion of the ring portion R with the interposition of the outer shell 30 of the outer bag 31, thereby preventing the driver D from being engaged with the rear end Rbe portion of the ring portion R. Further, since the inner bag 65 is disposed in front of the thoracic region DB of the driver D with the interposition of the outer bag 31, if inflated with an inflation gas G from the supply ports 68, 71 of the inner bag 65, the outer bag 31 is deployed over the ring surface RP including the rear end Rbe portion as shown in (B) of FIG. 10, FIG. 11 and FIG. 12, so that the outer bag 31 as fully inflated is supported by the ring portion R and protects the driver D. Moreover, with respect to the height from the ring surface RP, the inner bag 65 as inflated is configured such that the height hb of the rear portion 65b is greater than the height hf of the front portion 65a. With this configuration, since the front portion 65a of the inner bag 65 is thinner than the rear portion 65b, even if the chin DJ" of the driver D" is disposed proximate the boss section B (or inlet port 34, as can be seen in FIG. 2) at airbag deployment as shown in (A) of FIG. 10, a rearward pushing force of the front portion 65a will be limited, so that a damage to the chin DJ" of the driver D" in an initial stage of airbag deployment will be reduced.

Therefore, the airbag device 10 in accordance with the exemplary embodiment is able to protect the driver D, D" adequately with the airbag 29 in the course of deployment even if the driver D, D" is positioned in proximity to the ring portion R of the steering wheel W when the airbag device 10 is actuated.

In the airbag device 10 in accordance with the exemplary embodiment, the outer circumferential wall 66 of the inner bag 65 as fully inflated includes the upper wall 67 that is opposed to the driver-side wall 39 of the outer bag 31, and the lower wall 70 that is opposed to the vehicle-side wall 32 of the outer bag 31 and includes the inlet port 34 and mounting portion 35. The upper wall 67 and the lower wall 70 are jointed together by the respective outer circumferential edges 67a, 70a. As the supply ports to the outer bag 31, the inner bag 65 includes the lower supply port 71 that is disposed in the rear portion 70b of the lower wall 70, and two upper supply ports 68L, 68R that are disposed at left and right portions of the area in the upper wall 67 farther forward than the lower supply port 71. Further, the lower supply port 71 as opened has the greater opening area than the total of opening areas of the upper supply ports 68L, 68R as opened.

With this configuration, as shown in (B) of FIG. 10 and (A) of FIG. 12, the inner bag 65 as inflated feeds an inflation gas G toward a rear portion 32a of the vehicle-side wall 32 of the outer bag 31 via the lower supply port 71 having a large opening area. Due to a reaction force to the emission of the inflation gas G, the upper wall 67 of the inner bag 65, especially a rear portion 67b of the upper wall 67, moves upward and will push the thoracic region DB of the driver D rearward if he is proximate to the rear end Rbe portion of the ring surface RP. Accordingly, the upper wall 67 of the inner bag 65 will push the thoracic region DB of the driver D away from the ring portion R adequately. Moreover, with the greater opening area than the total of the opening areas of the left and right upper supply ports 68L, 68R, the lower supply port 71 will release the inflation gas G quickly, so that the rear portion 65b of the inner bag 65 will be able to push the thoracic region DB of the driver D away from the ring portion R quickly as shown in FIG. 10, which will also promote the inflation of a rear portion 31b of the outer bag 31. Moreover, since the upper supply ports 68L, 68R are disposed at the left and right portions in the upper wall 67 of the inner bag 65 and farther forward than the lower supply port 71, they are able to feed the inflation gas G toward a front portion 31a of the outer bag 31 in a bifurcating fashion into the left and right, as shown in (A) of FIG. 12, without throwing the gas G directly at the chin DJ" of the driver D", while the outer bag 31 will push the chin DJ" of the driver D" apart from a vicinity of the boss section B (or inlet port 34) and be deployed between the ring portion R and a vicinity of the head DH of the driver D, D", as shown in (A) of FIG. 11. Furthermore, since the upper supply ports 68L, 68R are disposed in the upper wall 67 that is opposite from the lower wall 70 where the lower supply port 71 is disposed, a reaction force to the emission of the inflation gas G from the upper supply ports 68L, 68R acts downwardly, i.e. in an opposite direction to that of the lower supply port 71. Accordingly, the upper supply ports 68L, 68R will feed the outer bag 31 with an upward inflation gas G, keeping steady opening surfaces, without deforming the upper wall 67 of the inner bag 65 in such a manner as to float upward. As a consequence, the outer bag 31 will be inflated in a balanced fashion as a whole with the inflation gases G supplied from the lower supply port 71 and upper supply ports 68L, 68R of the inner bag 65, suitably to receive the driver D.

When a supply of inflation gas G from the inflator 15 stops at full deployment of the outer bag 31, the inner bag 65 slightly deflates from the fully inflated state as shown in (B) of FIG. 11 while the outer bag 31 keeps its fully inflated shape.

In the airbag device 10 in accordance with the exemplary embodiment, furthermore, the outer bag 31 as fully inflated has such a shape that the front portion 29a has the thickness Tf greater than the thickness Tb of the rear portion 29b, as shown in (B) of FIG. 11.

When the airbag 29 or outer bag 31 is fully inflated and supported by the ring surface RP of the ring plane R that is inclined downward to the rear, the above configuration will help deploy the driver-side wall 39 of the airbag 29 vertically, so that an arresting surface 41 (FIGS. 2 and 11) of the driver-side wall 39 will be able to receive a generally entire surface of the driver D, who is moving forward, from the head DH to the abdomen DS uniformly, and protect the driver D without applying a partial reaction force to him. Therefore, the airbag device in accordance with the exemplary embodiment will exert an improved restraint performance against a driver D who is moving forward.

In the illustrated embodiment, the difference between the thicknesses Tf and Tb in the front portion 29a and rear portion 29b of the airbag 29 is formed by providing the front-side base cloth 55 and tethers 44. The difference between the thicknesses Tf and Tb may also be formed by changing the shape of the outer shell 30 only, changing the film length of the outer shell 30 only, or by providing a tether only.

In the foregoing exemplary embodiment, the ring portion R of the steering wheel W is configured such that the width LF in the front and rear direction of the portion of the ring portion R to the front from the boss section B is smaller than the respective widths LL, LR in the left and right direction of the portions of the ring portion R to the left and right from the boss section B.

When the airbag device 10 is mounted on the steering wheel W thus configured, there seems to be a fear that the airbag 29 as inflated cannot be directly supported by the front portion Rf of the ring portion R. However, with the thickness Tf of the front portion 29a of the airbag 29 thicker than that of the rear portion 29b, the vehicle-side wall 32 will be supported by front end portions (or front surfaces) Rlf, Rrf of the left portion Rl and right portion Rr of the ring portion R and/or a front surface Rff of the front portion Rf of the ring portion R, thus able to acquire a reaction force even if the driver-side wall 39 receives the driver D and is going to move forward. Therefore, an advancing amount of the driver-side wall 39 in the front portion 29a will be suppressed to a similar degree to that in the rear portion 29b of the airbag 29, so that the airbag 29 will be smoothly able to restrain the forward-moving driver D generally as a whole from the head DH down to the abdomen DS softly with the generally vertical arresting surface 41 of the driver-side wall 39, with a generally even arresting stroke.

Although the steering wheel W in the foregoing embodiment has a shorter dimension in the front and rear direction than in the left and right direction, the airbag device 10 for a driver's seat in accordance with the exemplary embodiment may also be mounted on a steering wheel the ring portion R of which has a generally circular annular shape. Also in this case, the inner bag may be configured to be inflated into such a shape that the rear portion protrudes farther rearward than the rear end portion of the ring surface, and that the height from the ring surface is greater in the rear portion than in the front portion.

The airbag device for a driver's seat in accordance with the exemplary embodiment is adapted to be mounted on a steering wheel that includes a ring portion for gripping for steering operation, and a boss section disposed in a vicinity of a center of the ring portion, and in which a ring surface composed of an upper surface of the ring portion is inclined downward to the rear. The airbag device includes an airbag that is folded and stored in the boss section of the steering wheel and configured to be inflated and deployed for protecting a driver. The airbag includes an outer bag that constitutes an outer shell of the airbag as inflated, and an inner bag that is configured to be inflated inside the outer bag. The outer bag includes a driver-side wall for receiving the driver, and a vehicle-side wall that is configured to be supported by the ring surface of the ring portion at airbag deployment, and includes an inlet port of an inflation gas in a vicinity of a center thereof, and a mounting portion on the boss section in a periphery of the inlet port. The vehicle-side wall and the driver-side wall are jointed together by respective outer circumferential edges. The inner bag shares the inlet port and mounting portion with the outer bag and includes at least one supply port for supplying the inflation gas to the outer bag. The inner bag is configured to complete inflation prior to the outer bag, and the outer bag is configured to be inflated with the inflation gas supplied from the supply port of the inner bag. The inner bag is configured to be inflated into such a shape that a rear portion protrudes farther rearward than a rear end portion of the ring surface, and that a height from the ring surface is greater in the rear portion than in a front portion.

If the airbag device in accordance with the exemplary embodiment is actuated when the driver is sitting in proximity to the ring portion of the steering wheel, the inner bag is inflated first. Since the inner bag is inflated in such a manner that the rear portion protrudes farther rearward than the rear end portion of the ring surface, the rear portion of the inner bag pushes the thoracic region of the driver rearward and apart from the rear end portion of the ring portion with the interposition of the outer bag, thereby preventing the driver from being engaged with the rear end portion of the ring portion. Further, since the inner bag is disposed in front of the thoracic region of the driver with the interposition of the outer bag, if inflated with an inflation gas from the supply port of the inner bag, the outer bag is deployed over the ring surface including the rear end portion, so that the outer bag as fully inflated is supported by the ring portion and protects the driver. Moreover, the inner bag as inflated is configured such that the height from the ring surface is greater in the rear portion than in the front portion. With this configuration, since the front portion of the inner bag is thinner than the rear portion, even if the driver is so positioned that the thoracic region is close to the rear end portion of the ring portion and the chin of the driver is disposed proximate to the boss section (or inlet port) at airbag deployment, a rearward pushing force of the front portion is limited, so that a damage to the chin of the driver in an initial stage of airbag deployment will be reduced.

Therefore, the airbag device in accordance with the exemplary embodiment is able to protect the driver adequately with the airbag in the course of deployment even if the driver is positioned in proximity to the ring portion of the steering wheel when the airbag device is actuated.

In various embodiments, the airbag device for a driver's seat may be configured as follows: The inner bag as fully inflated includes an upper wall that is opposed to the driver-side wall of the outer bag, and a lower wall that is opposed to the vehicle-side wall of the outer bag and includes the inlet port and mounting portion, and the upper wall and the lower wall are jointed together by respective outer circumferential edges; the inner bag includes, as the supply ports, a lower supply port that is disposed in a rear portion of the lower wall, and two upper supply ports that are disposed at left and right portions of an area in the upper wall farther forward than the lower supply port; and the lower supply port as opened has a greater opening area than a total of opening areas of the upper supply ports as opened.

With this configuration, the inner bag as inflated feeds an inflation gas toward the vehicle-side wall of the outer bag via the lower supply port having a large opening area. Due to a reaction force to the emission of the inflation gas, the upper wall of the inner bag, especially a rear portion of the upper wall, moves upward and will push the thoracic region of the driver rearward if he is proximate to the rear end portion of the ring surface. Accordingly, the upper wall of the inner bag will push the thoracic region of the driver away from the ring portion adequately. Moreover, with the greater opening area than the total of the opening areas of the left and right upper supply ports, the lower supply port will release the inflation gas quickly, so that the rear portion of the inner bag will be able to push the thoracic region of the driver away from the ring portion quickly, which will also promote the inflation of a rear portion of the outer bag. Moreover, since the upper supply ports are disposed at the left and right portions in the upper wall of the inner bag and farther forward than the lower supply port, they are able to feed the inflation gas toward a front portion of the outer bag in a bifurcating fashion into the left and right, without throwing the gas directly at the chin of the driver, while the outer bag will push the chin of the driver apart from a vicinity of the boss section and be deployed between the ring portion and a vicinity of the head of the driver. Furthermore, since the upper supply ports are disposed in the upper wall that is opposite from the lower wall where the lower supply port is disposed, a reaction force to the emission of the inflation gas from the upper supply ports acts downwardly, i.e. in an opposite direction to that of the lower supply port. Accordingly, the upper supply ports will feed the outer bag with an upward inflation gas while keeping steady opening surfaces, without deforming the upper wall of the inner bag in such a manner as to float upward. As a consequence, the outer bag will be inflated in a balanced fashion as a whole with the inflation gases supplied from the lower supply port and upper supply ports of the inner bag, suitably to receive the driver.

In various embodiments, the outer bag of the airbag may be configured to be inflated into such a shape that a front portion has a greater thickness than a rear portion.

When the airbag is fully inflated and supported by the ring surface of the ring plane that is inclined downward to the rear, the above configuration will help deploy the driver-side wall of the outer bag vertically, so that an arresting surface of the driver-side wall will be able to receive a generally entire surface of the driver, who is moving forward, from the head to the abdomen uniformly, and protect the driver without applying a partial reaction force to him. Therefore, the airbag device in accordance with the exemplary embodiment will exert an improved restraint performance against a driver who is moving forward.

What is claimed is:

1. An airbag device for a driver's seat adapted to be mounted on a steering wheel that includes a ring portion for gripping for steering operation, and a boss section disposed in a vicinity of a center of the ring portion, and in which a ring surface composed of an upper surface of the ring portion is inclined downward to the rear, the airbag device comprising:

an airbag that is folded and stored in the boss section of the steering wheel and configured to be inflated and deployed for protecting a driver, the airbag including an outer bag that constitutes an outer shell of the airbag as inflated, and an inner bag that is configured to be inflated inside the outer bag, wherein the outer bag includes:

a driver-side wall for receiving the driver; and a vehicle-side wall that is configured to be supported by the ring surface of the ring portion at airbag deployment, the vehicle-side wall including an inlet port of an inflation gas in a vicinity of a center thereof, and a mounting portion on the boss section in a periphery of the inlet port, the vehicle-side wall being jointed with the driver-side wall by respective outer circumferential edges;

wherein the inner bag shares the inlet port and mounting portion with the outer bag and includes at least one supply port for supplying the inflation gas to the outer bag;

wherein the inner bag is configured to complete inflation prior to the outer bag, and the outer bag is configured to be inflated with the inflation gas supplied from the at least one supply port of the inner bag; and wherein the inner bag is configured to be inflated into such a shape that a rear portion protrudes farther rearward than a rear end portion of the ring surface, and that a height from the ring surface is greater in the rear portion than in a front portion.

2. The airbag device of claim 1, wherein:

the inner bag as fully inflated includes an upper wall that is opposed to the driver-side wall of the outer bag, and a lower wall that is opposed to the vehicle-side wall of the outer bag and includes the inlet port and mounting portion, and the upper wall and the lower wall are jointed together by respective outer circumferential edges;

the inner bag includes, as the at least one supply port, a lower supply port that is disposed in a rear portion of the lower wall, and two upper supply ports that are disposed at left and right portions of an area in the upper wall farther forward than the lower supply port; and the lower supply port as opened has a greater opening area than a total of opening areas of the upper supply ports as opened.

3. The airbag device of claim 1, wherein the outer bag of the airbag is configured to be inflated into such a shape that a front portion has a greater thickness than a rear portion.

* * * * *